United States Patent [19]

Dessaux

[11] Patent Number: 5,071,184

[45] Date of Patent: Dec. 10, 1991

[54] MOTORIZED LOAD ROTATION DEVICE WITH AUTONOMOUS POWER SUPPLY FOR CABLE LIFTING MECHANISMS

[75] Inventor: Claude Dessaux, La Clayette, France

[73] Assignee: Potain, Ecully, France

[21] Appl. No.: 553,806

[22] Filed: Jul. 18, 1990

[30] Foreign Application Priority Data

Jul. 18, 1989 [FR] France ............................... 89 10376

[51] Int. Cl.[5] .......................... B66C 1/34; H02K 7/00

[52] U.S. Cl. .................................. 294/82.15; 318/161

[58] Field of Search ................. 294/82.15, 86.41, 67.5, 294/81.4; 254/335, 337; 318/140, 150, 161

[56] References Cited

U.S. PATENT DOCUMENTS

| | | | |
|---|---|---|---|
| 1,577,283 | 3/1926 | Mitchell | 294/82.15 |
| 3,210,115 | 10/1965 | Graham et al. | 294/82.15 |
| 3,633,961 | 1/1972 | Speransky | 294/82.15 |
| 4,065,702 | 12/1977 | Locker et al. | 318/161 |
| 4,321,478 | 3/1982 | Plunkett et al. | 318/161 X |
| 4,612,494 | 9/1986 | Kawamura | 318/150 X |
| 4,642,535 | 2/1987 | Hucker | 318/161 |

FOREIGN PATENT DOCUMENTS

| | | |
|---|---|---|
| 3234395 | 3/1984 | Fed. Rep. of Germany . |
| 1229282 | 9/1960 | France . |
| 7614360 | 6/1978 | Netherlands . |

*Primary Examiner*—Margaret A. Focarino
*Assistant Examiner*—Dean J. Kramer
*Attorney, Agent, or Firm*—Browdy and Neimark

[57] ABSTRACT

The device comprises a pulley block body (11) having several lines (25, 26, 27, 28) and several pulleys (12, 13) over which passes a lifting cable (4) forming a block and tackle (15), a grappling element (15) mounted to turn around a vertical shaft (14) and accommodating a hook (9), and electric motorization (16) to drive grappling element (15) in rotation. Pulley (13), over which the cable in the block and tackle passes, serves to drive an electric generator (35) which charges accumulators (36), the latter supplying the electricity needed for motorization (16). The device is applicable to turret slewing cranes and other cable lifting mechanisms.

11 Claims, 4 Drawing Sheets

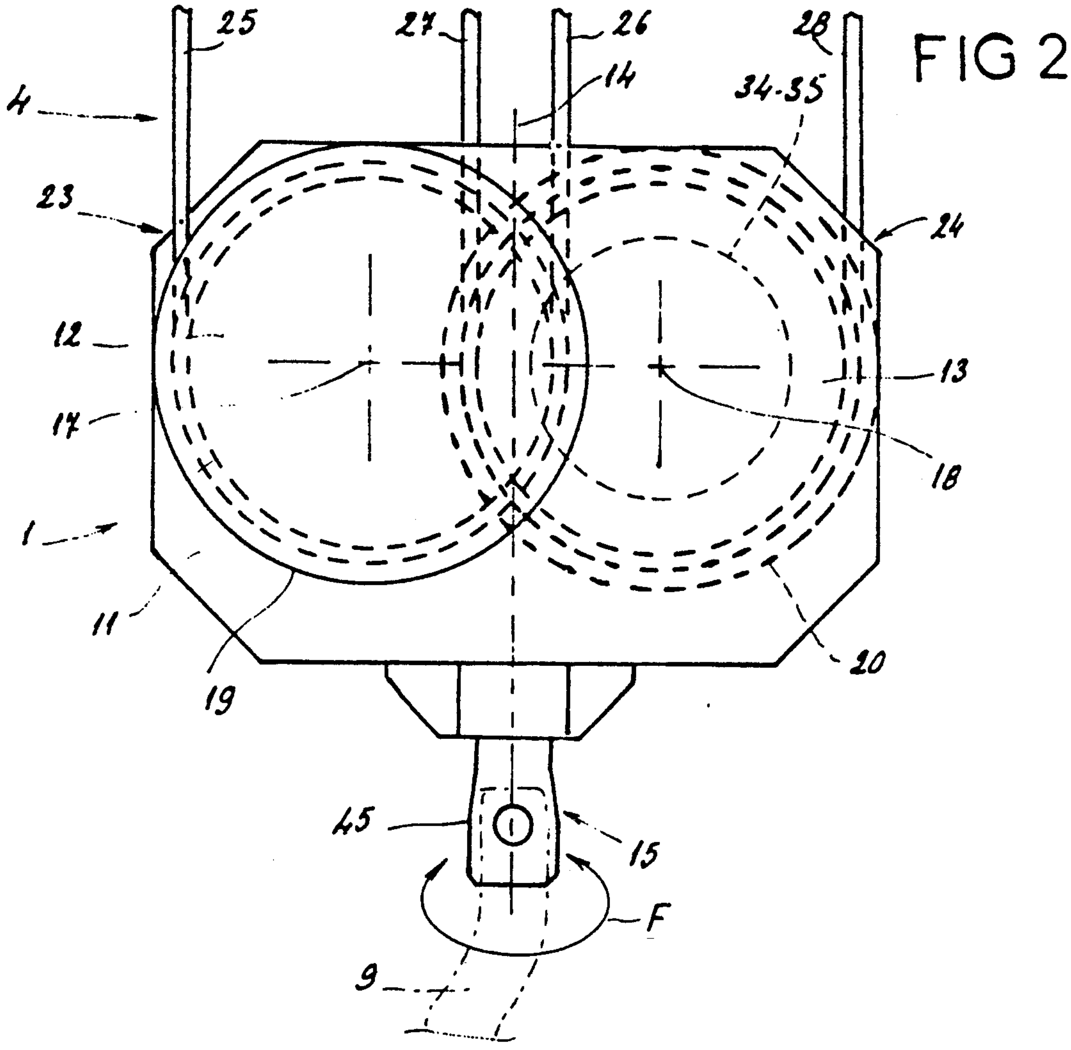
FIG 2
FIG 3
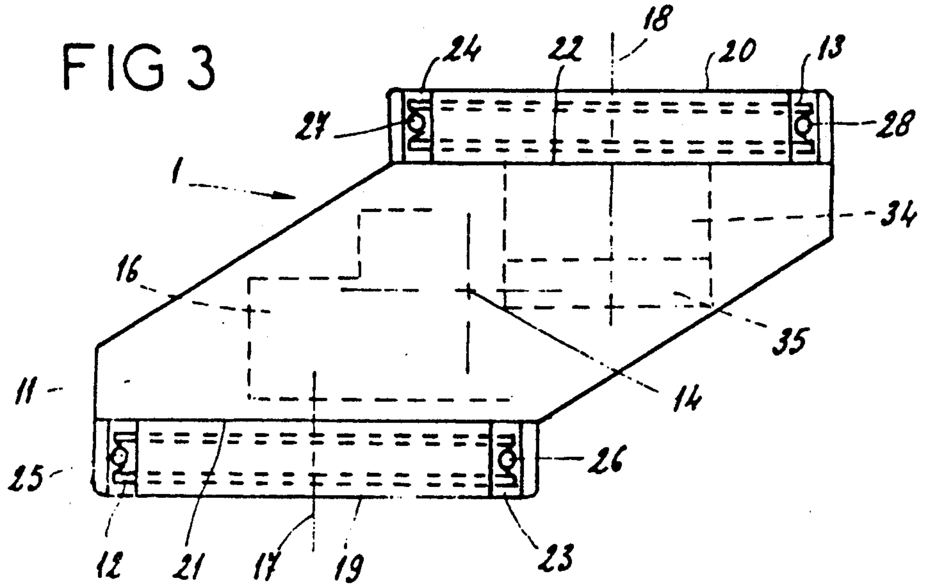

MOTORIZED LOAD ROTATION DEVICE WITH AUTONOMOUS POWER SUPPLY FOR CABLE LIFTING MECHANISMS

FIELD OF THE INVENTION

This invention pertains to a motorized load rotation device with autonomous power supply intended for cable lifting mechanisms such as turret slewing cranes, mounted cranes, rolling bridges, gantry supports, etc., such device ensuring the angular positioning of loads handled by such lifting devices.

BACKGROUND OF THE INVENTION

It is a well-known practice for these devices to use shank hooks mounted to turn on multi-line pulley blocks through the intermediary of sprockets, i.e., thrust ball bearings.

In the most common embodiments, the hook, with or without a suspended load, is rotated manually when approaching the place where the load is gripped or deposited. Despite protective devices and safety measures, this type of operation always places the operator or worker at bodily risk, whether this risk involves handling moving parts or simply exists by virtue of his proximity to the load being handled.

In more elaborate known embodiments (for example, see French patent 1 229 282) the rotation of the hook or more generally of the load gripping device is driven by electric motor, and is remote-controlled from the control station located on the lifting device. For turret slewing cranes with a distribution boom, for example with distribution carriage and lifting cable forming a block and tackle, pulley blocks already exist having a remote-controlled back-geared motor to drive the turning hook for rotation. In this case, the electric feed and remote control cable for the motorization of the turning hook passes over a coiler placed on the load distribution carriage, such cable winding and unwinding on the coiler drum depending on the position of the carriage on the boom and the height under the hook. In these embodiments, two problems must be overcome, i.e., on the one hand, first maintaining sufficient mechanical tension on the feed and remote control cable and, second, protection against the risk of shearing and deterioration of the feed and remote control cable in event the lifting cables become twisted.

As recommended by published German Patent Application 3 234 395, the problems related to the feed and remote control cable can be solved by feeding the electric motor that drives the hook in rotation using a battery mounted on the pulley block body, and by using radio remote control. This known solution nonetheless requires that the battery be recharged frequently, i.e. every night.

Finally, to avoid recharging the battery, a motorized load rotation device has already been conceived having an "autonomous" power supply, i.e. the motorized load rotation device itself ensures the production, storage, restoration and renewal of the power it needs to operate, taking advantage of the movement of the lifting cable through the pulley block with respect to a pulley in the device, while loads are being handled and especially during raising and lowering movements. In this way, published Dutch Patent Application 7614360 proposes a mechanical transmission from at least one pulley to a hydraulic pump, and a hydraulic circuit with an accumulator that makes it possible to feed a hydraulic motor that drives the load in rotation. Such a hydraulic embodiment is expensive and is justified only when applied to lifting devices that handle very heavy loads, as is the case especially for container carrier cranes in ports. Such a device also presents other problems:

Its autonomy, related to the hydraulic accumulator capacity, is limited.

Its total mass is high, considering all of the necessary mechanical and hydraulic mechanisms, which detracts from the useful load of the lifting unit.

The hydraulic mechanism to set the load into rotation must be electronically controlled and monitored.

A separate electricity source is also needed for the remote control signal receiver.

SUMMARY OF THE INVENTION

The present invention aims to correct these problems by supplying a motorized load rotation device for cable lifting mechanisms with autonomous electricity supply, wherein the electricity supplied covers both the feed for the motorization that drives the load in rotation and for the remote control signal receiving mechanism, the present device having a high degree of autonomy for a relatively limited mass.

To this end, the device according to the invention comprises in a known manner a pulley block body having several lines and several pulleys over which at least one lifting cable passes, forming a block and tackle, a grappling element mounted to turn around a substantially vertical shaft connected to the pulley block body and designed to accommodate a hook or another mechanism to grip a load to be handled, motorization to drive the grappling element in rotation around the aforementioned shaft, a rotating power generator driven by at least one pulley of the pulley block body over which the lifting cable passes, and a power storage mechanism charged by the generator and designed to supply the power needed to feed the motorization that drives the rotation of the grappling element, the pulley block body further incorporating means to receive command signals and to control the generator and motorization power supply. The present device is characterized in that the generator of the electricity to feed the motorization that sets the grappling element into rotation is an electric current generator whose rotor is driven mechanically in rotation by the pulley(s) in the pulley block body, in that the power storage mechanisms are means to store electricity, in that the motorization to drive the grappling element in rotation is electric, and in that the same electricity storage means also supply the electricity for the command signal reception mechanisms and control of the electric current generator and electric motorization feed.

In this way, according to the invention, a motorized load rotation device is created which is entirely autonomous and purely electric.

Although the device according to the invention essentially ensures the supply of electricity to feed the motorization to drive the grappling element and thus to drive the load in rotation, it must be noted that this device also makes it possible to feed auxiliary functions such as automatic load gripping, center of gravity finding, etc., free of any electric feed cable into the pulley block body.

According to a preferred embodiment of the invention, the electric current generator, held by the pulley block body, is an alternator with incorporated rectifier bridge and regulator, whose rotor is driven in rotation by the pulley in the pulley block body moving at the greatest speed, the alternator ensuring the charging of at least one accumulator constituting the electricity storage mechanism, while the motorization comprises a direct current electric motor that drives the grappling element in rotation through the intermediary of a reduction unit, the feed for the electric motor from the accumulator(s) being controlled by an electric and electronic control unit incorporated into the pulley block body.

The alternator rotor is advantageously driven in rotation by the pulley in the pulley block body operating at the highest speed, this drive being ensured through the intermediary of a speed multiplier, preferably of the spider gear type. In this way, with a minimum space requirement, the alternator is set into rotation at a high speed, optimal for generating electricity.

According to a particular embodiment, the direct current electric motor drives the grappling element in rotation through the intermediary of a geared reduction unit comprising a first stage composed of a spider gear reducer and a second stage composed of a spur gear set reducer.

According to an additional characteristic, the device according to the invention is equipped with a relative position sensor such as an absolute or incremental coder, which controls the angular position of the grappling element turning with respect to the pulley block body, and a gyrometer that controls the absolute positioning of the turning grappling element. In the case of a relative position sensor composed of a rotating coder, the coder can be driven in rotation by a gear meshing with a toothed crown in the last spur gear set belonging to the aforementioned reducer, the crown being fastened to the turning grappling element.

According to another characteristic, the turning grappling element itself comprises an upper cylindrical part mounted on a thrust ball bearing inside the pulley block body and provided with an orifice designed for the passage of an electric collector outlet cable, to carry stored electricity to the electrical functions of the gripping device and/or other accessories, and also a lower part outside of the pulley block body serving to support the gripping device. The electricity feed for any auxiliary functions, coming from the accumulator(s), is thus easily provided.

BRIEF DESCRIPTION OF THE DRAWING

The invention will be more clearly understood through use of the description below, in reference to the accompanying schematic drawing showing an embodiment of the motorized load rotation device with autonomous power supply for cable lifting mechanisms, as a non-restrictive example.

FIG. 2 is a lateral overall view of the device;

FIG. 3 is a plane top view of the device corresponding to the lateral view in FIG. 2;

DETAILED DESCRIPTION OF EMBODIMENTS

Figure 1:
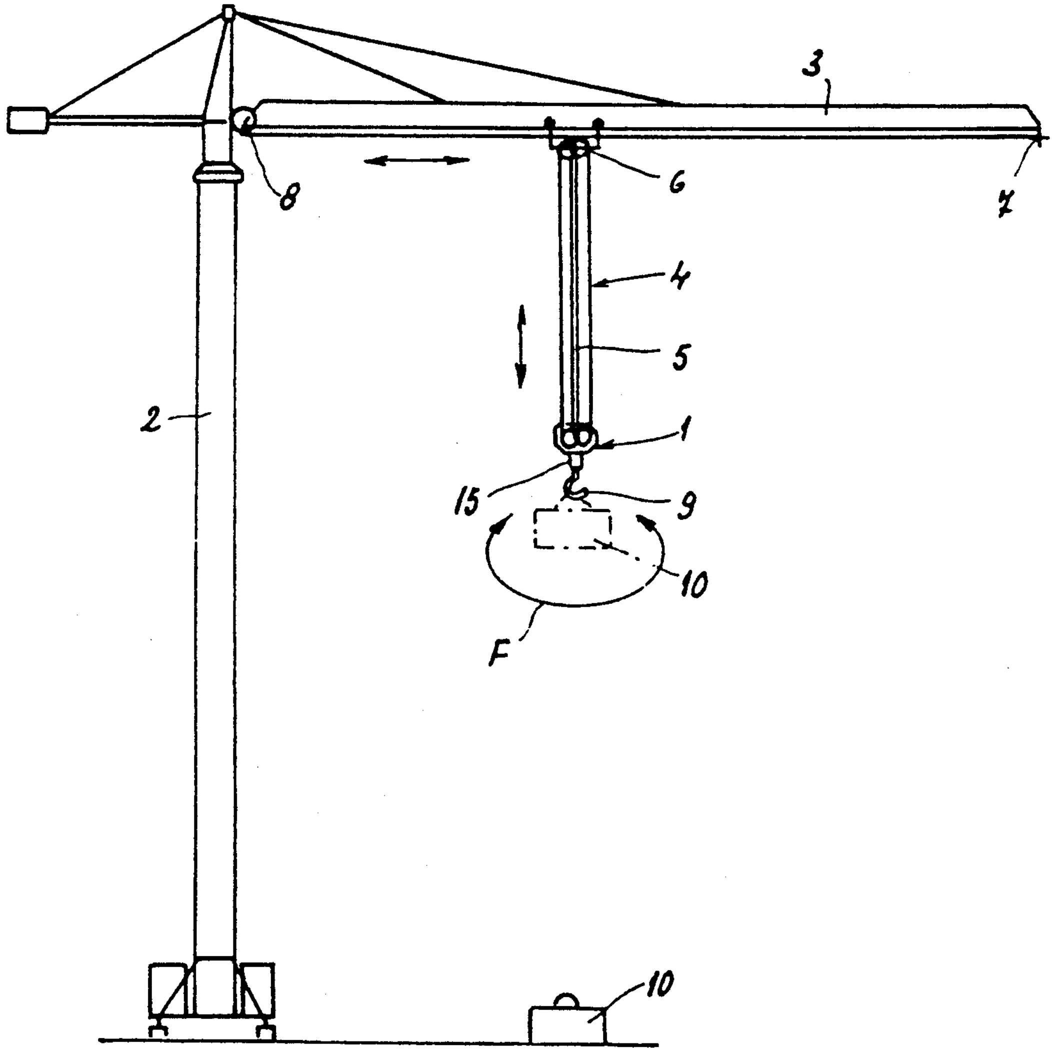
FIG. 1 shows a turret slewing crane with distributing boom endowed with the device according to the invention.

As shown in FIG. 1, a device according to the invention, designated as a unit with reference 1, is intended to equip cable lifting mechanisms such as a turret slewing crane 2 with distributing boom 3. Device 1 is suspended from boom 3 through the intermediary of a lifting cable 4 forming a block and tackle 5 between distribution carriage 6 and the device 1. At one end, the lifting the cable 4 is attached at a point 7 at the head of boom 3; at the other end, the cable 4 winds on the barrel of a winch 8 placed at the foot of the boom 3. From device 1 is suspended a turning hook or gripping device 9 from which load 10 to be handled is suspended or to which it is attached.

With reference in particular to FIGS. 2 and 3, in the known manner device 1 comprises a "four-line" pulley block body 11 having two pulleys 12, 13 placed symmetrically around a vertical axis 14, a grappling element 15 mounted to turn around a shaft along the vertical axis 14 intended to accommodate hook or gripping device 9 and electric motorization 16 to drive qrappling element 15 in rotation around the shaft of axis 14 as indicated by Arrow F.

The pulley block body 11 supports horizontal rotation shafts 17, 18 of pulleys 12, 13 which are protected by sheet metal housings !9, 20 attached to lateral plates 21, 22 of pulley block body 11. Housings 19, 20 have openings 23, 24 in their upper parts designed to allow the passage respectively of two cable lines 25, 26 coming out of pulley 12 and two cable lines 27, 28 coming out of the other pulley 13.

Figure 4:
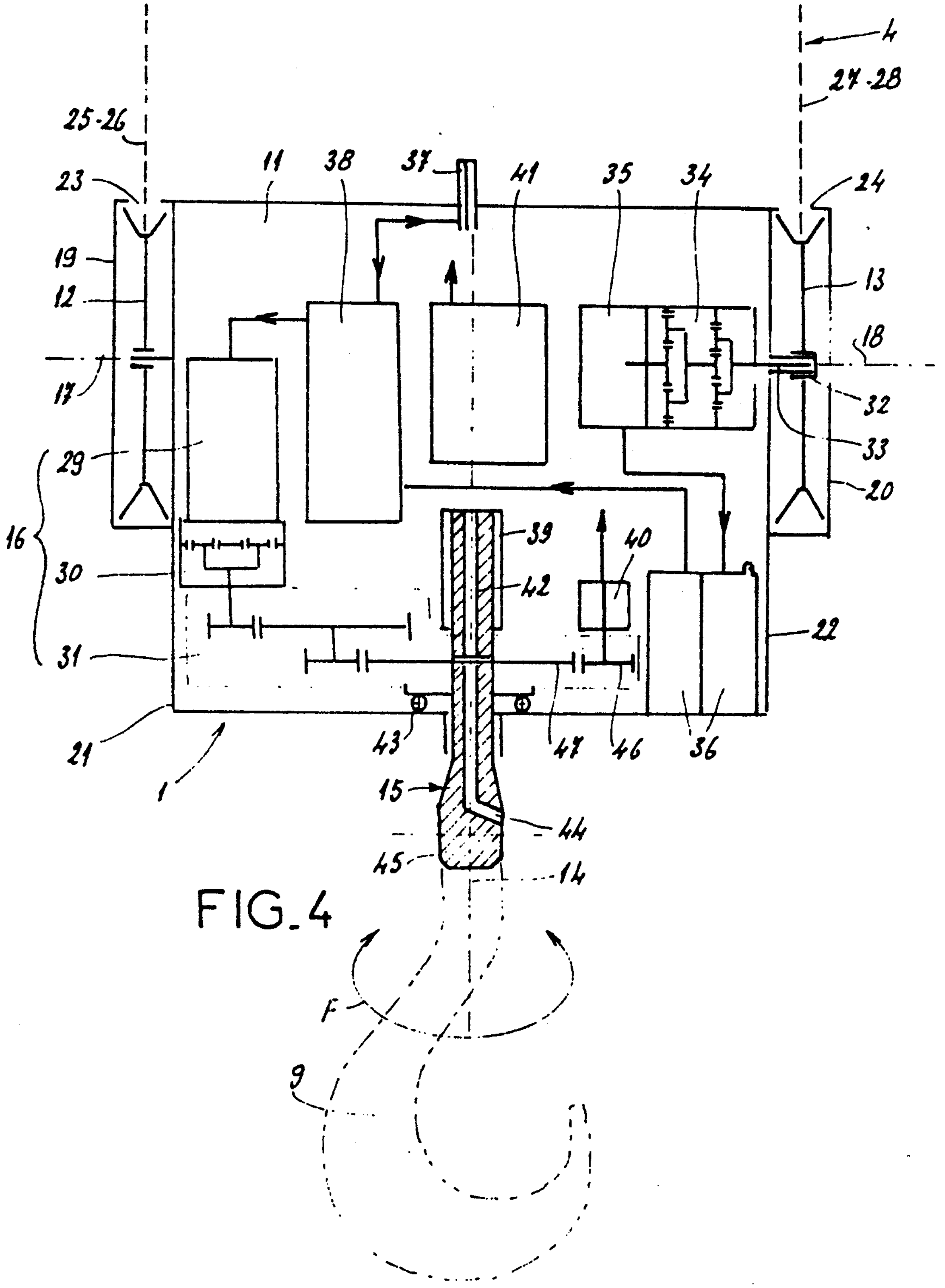
FIG. 4 is a schematic view of the device with its internal components.

As shown in FIG. 4, motorization 16 is composed of a direct current electric motor 29 with permanent magnets operating, for example, under 24 V of voltage, a single spider gear reduction unit 30 designed exactly for the torque to be transmitted in order to have minimum inertia, and a spur gear set 31 reduction unit adapted to drive turning grappling element 15 in rotation.

Moreover, because of block and tackle 5, pulley 13 placed on the side of moving line 28 turns at twice the speed of pulley 12 placed on the side of fixed line 25. Hub 32 of pulley 13 is attached to an entry shaft 33 of a spider gear speed multiplier 34 adapted to an alternator 35 with incorporated rectifier bridge and regulator Which ensures the charge of one or more electric accumulators 36 housed in the pulley block body 11.

The device further comprises a radio control 37 transmitter-receiver and an electric and electronic control unit 38 incorporated into the pulley block body 11. A turning collector 39 allows electricity to pass from the fixed part of device I to the electric functions of the part (9, 10, 15) in rotation in the event such functions are provided. A relative position sensor 40 such as an absolute or incremental coder monitors the relative angular position of grappling element 15 with respect to pulley bock body 11, and a gyrometer 41 monitors the absolute position of turning grappling element 15.

The turning grappling element 15 comprises an upper cylindrical part 42 mounted on a thrust ball bearing 43 inside the pulley block body 11 and provided with an orifice 44 for the passage of the electric collector 39 outlet cable for the electric functions of gripping device 9 or other specialized accessories, and a lower part 45 outside of pulley block body 11 serving as a support for gripping device 9.

The relative position sensor 40, such as a coder, is driven in rotation through the intermediary of a gear 46 that meshes with a toothed crown 47 belonging to the last spur gear set 31 for driving grappling element 15 in rotation, the crown gear 47 being attached to the upper part 42 of grappling element 15.

Figure 5:
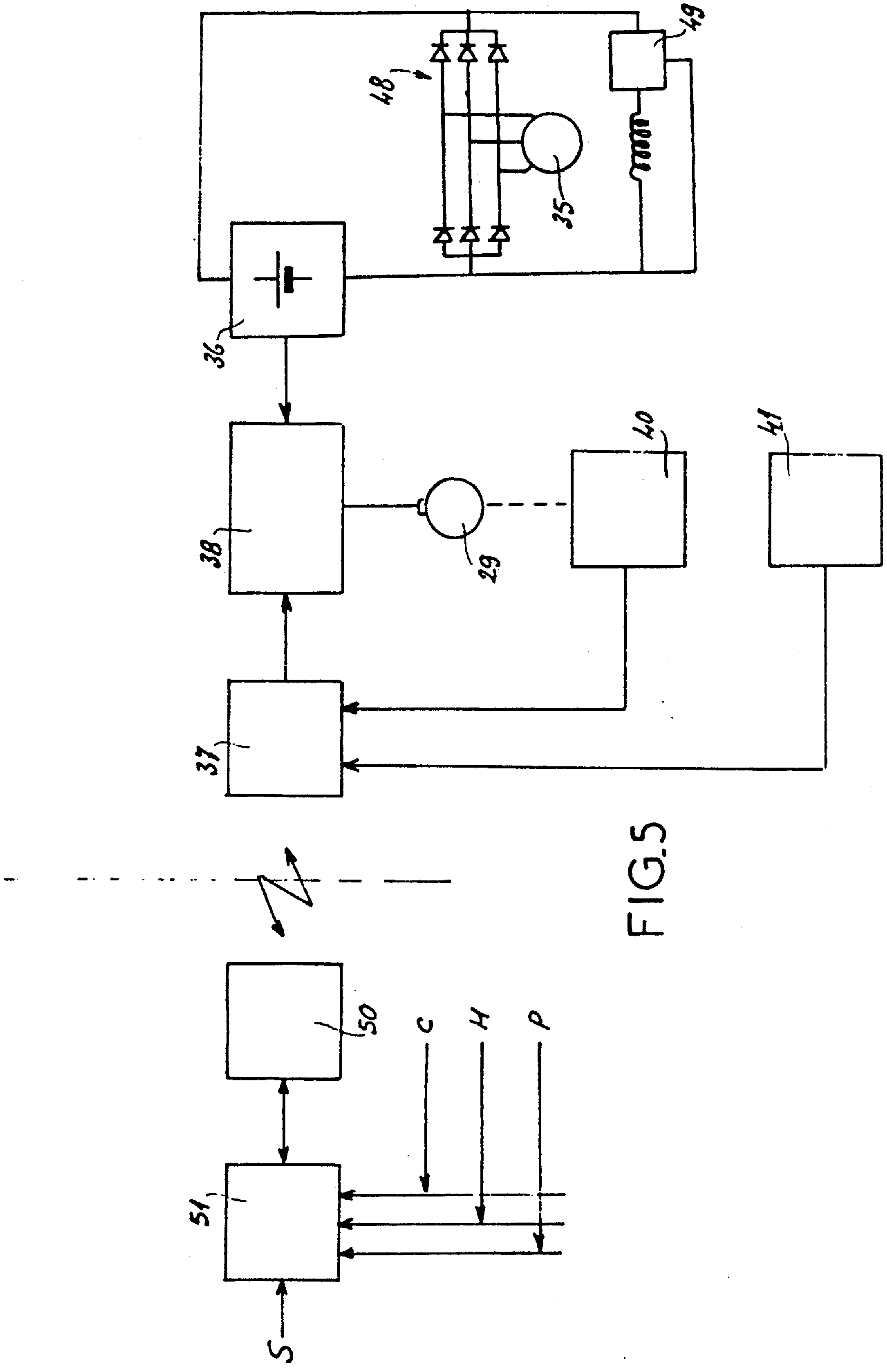
FIG. 5 is a synoptic functional diagram of the device.

The operation of device 1 according to the invention, also illustrated by the synoptic diagram in FIG. 5, is as follows:

During the lifting phases, when pulley block body 11 is raised or lowered, the pulley 13 moving at the highest speed drives the rotor of the alternator 35 rotor, through the intermediary of spider gear multiplier 34, which induces a three-phase alternating electric current in the stator of the alternator. The induced current is rectified through the intermediary of a diode rectifier 48 and regulated by an incorporated regulator 49 which maintains the voltage of the current recharging the accumulator(s) 36 at 24 V, for example.

The operation of alternator 35 makes it possible to maintain the charge of the accumulator(s) 36 at a sufficient value to ensure the power feed for the on-board functions without using outside sources. In particular, accumulator(s) 36 ensure the feed for direct current electric motor 29 with permanent magnets under a voltage of 0 to 24 V, through the intermediary of control unit 38, to drive the grappling element 15 and gripping device 9 in rotation, with or without a load, and to feed collector 39 for the electric functions of gripping device 9 or other accessories.

Command signals are transmitted to device I by wireless links between a fixed transmission-receiving station 50 available to the operator and the on-board transmitter-receiver 37.

Command signals are processed in the controller 51 depending on programmed or manual commands from the operator and information coming from various sensors, such as the value of load C, height H of the load and angular position P of boom 3 of the lifting device, etc., which represent influential parameters for the precise angular positioning of load 10 and its rotation.

On-board transmitter-receiver 37 also receives signals from sensor 40 which provides the position of turning grappling element 15 with respect to pulley block body 11 and signals from gyrometer 41 which indicates the position of turning grappling element 15 with respect to the last registered position at sensor 40.

Command signals are next amplified inside electric and electronic control unit 38 to feed motor 29 with an intensity and under voltage that vary respectively depending on the desired torque and rotation speed.

In this way, a motorized load rotation device with autonomous power supply is created, the relative movement of lifting cable 4 and device I causing accumulator 36 to be charged, through the intermediary of alternator 35, the accumulator serving as a reserve of power to feed motorization 16 of turning grappling element 15. It is thus understood that the raising movements allow the device to produce and renew its power during normal use of the lifting device. It is noted that not only raising and lowering movements of pulley block body 11, but also the distribution movement by the displacement of carriage 6 along boom 3 contribute to the generation of electricity: even if distribution carriage 6 continues to move relatively slowly, it can correspond with running of lifting cable 4, adding to the running generated by the raising/lowering movement, thus driving alternator 35 at a higher speed.

Of course, the invention is not limited solely to the embodiment of said motorized load rotation device with autonomous power supply described above as an example; on the contrary, it encompasses all other variations of embodiments and applications following the same principle. In particular, it would not depart from the framework of the invention to:

replace alternator 35 with another charge generator such as a dynamo;

replace accumulator 36 with another device or component that stores the electricity produced;

modify constructive details such as the position of the relative position sensor 40 in the kinematic sequence in which grappling cable 15 is driven in rotation, or, furthermore, means to drive alternator 35 from pulley 13;

adapt the device according to the invention to a pulley block body having a different number of lines and pulleys;

provide devices for cable lifting mechanisms other than turret slewing cranes with distributing booms.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. Motorized load rotating device with autonomous power supply for cable lifting mechanisms comprising a pulley block body having several lines and several pulleys over which passes at least one lifting cable forming a block and tackle, a grappling element mounted to turn around a substantially vertical axis connected to pulley block body and accommodating a means to grip a load to be handled, motorization to drive said grappling element in rotation (Arrow F) around said axis, a rotating power generator driven by at least one pulley of said pulley block body over which said lifting cable passes, and power storage means charged by a generator for supplying the power needed to feed the motorization to rotate said grappling element, said pulley block body further incorporating devices to receive command signals and to control generator and motorization feed, said generator for the power to feed the motorization to rotate the grappling element comprising an electric current generator having a rotor driven mechanically in rotation by said pulleys of said pulley block body, said power storage means being means for storing electricity, said motorization to rotate grappling element being an electric motor means and the same means to store electricity also feeding the mechanisms for receiving command signals and signals for the control of electric current generator and the electric motorization feed, wherein said electric current generator held by pulley block body is an alternator with incorporated rectifier bridge and regulator having a rotor which is driven in rotation by pulley of pulley block body operating at high speed, said alternator ensuring the charging of at least one accumulator constituting the electricity storage means.

2. Motorized load rotation device according to claim 1, wherein said motorization (16) comprises a direct current electric motor (29), which ensures the driving in rotation of grappling element (15) through the intermediary of a reduction unit (30, 31), the electric motor (29) feed from accumulator(s) (36) being controlled by an electric and electronic command unit (38) incorporated into said pulley block body (11).

3. Motorized load rotation device according to claim 1, wherein said rotor of alternator (35) is driven in rotation by the pulley (13) of said pulley block body (11) operating at high speed, said drive being ensured through the intermediary of a speed multiplier (34).

4. Motorized load rotation device according to claim 2, wherein said direct current electric motor (29) ensures the driving in rotation of grappling element (15) through the intermediary of a toothed reduction unit comprising a first stage composed of a spider gear reducer (30) and a second stage composed of a spur gear set reducer (31).

5. Motorized load rotation device according to claim 4, further comprising a relative position sensor (40) which monitors the angular positioning of the turning grappling element (15), with respect to pulley block body (11), and a gyrometer (41) which monitors the absolute position of turning grappling element (15).

6. Motorized load rotation device according to claim 5, wherein said relative position sensor, composed of a rotating coder (40), is driven in rotation by a gear (46) that meshes with a toothed crown (47) of the last spur gear set (31) belonging to the reducer driving grappling element (15) in rotation, said crown (47) being fastened to turning grappling element (15).

7. Motorized load rotation device according to claim 2, wherein said rotor of alternator (35) is driven in rotation by the pulley (13) of said pulley block body (11) operating at high speed, said drive being ensured through the intermediary of a speed multiplier (34).

8. Motorized load rotation device according to claim 7, further comprising a relative position sensor (40) which monitors the angular positioning of the turning grappling element (15), with respect to pulley block body (11), and a gyrometer (41) which monitors the absolute position of turning grappling element (15).

9. Motorized load rotating device with autonomous power supply for cable lifting mechanisms comprising a pulley block body having several lines and several pulleys over which passes at least one lifting cable forming a block and tackle, a grappling element mounted to turn around a substantially vertical axis connected to pulley block body and accommodating a means to grip a load to be handled, motorization to drive said grappling element in rotating (Arrow F) around said axis, a rotating power generator driven by at least one pulley of said pulley block body over which said lifting cable passes, and power storage means charged by a generator for supplying the power needed to feed the motorization to rotate said grappling element, said pulley block body further incorporating devices to receive command signals and to control generator and motorization feed, said generator for the power to feed the motorization to rotate the grappling element comprising an electric current generator having a rotor driven mechanically in rotation by said pulleys of said pulley block body, said power storage means being means for storing electricity, said motorization to rotate grappling element being an electric motor means and the same means to store electricity also feeding the mechanisms for receiving command signals and signals for the control of electric current generator and the electric motorization feed, wherein said turning grappling element comprises an upper cylindrical part mounted on a thrust ball bearing inside pulley block body and endowed with an orifice for the passage of an electric turning collector outlet cable in order to carry stored electricity to the electrical functions of gripping device and, a lower part outside of pulley block body serving as a support for gripping device.

10. Motorized load rotation device with autonomous power supply for cable lifting mechanisms comprising a pulley block body having several lines and several pulleys over which passes at least one lifting cable forming a block and tackle, a grappling element mounted to turn around a substantially vertical axis connected to pulley block body and accommodating a means to grip a load to be handled, motorization to drive said grappling element in rotation (Arrow F) around said axis, a rotating power generator driven by at least one pulley of said pulley block body over which said lifting cable passes, and power storage means charged by a generator for supplying the power needed to feed the motorization to rotate said grappling element, said pulley block body further incorporating devices to receive command signals and to control generator and motorization feed, said generator for the power to feed the motorization to rotate the grappling element comprising an electric current generator having a rotor driven mechanically in rotation by said pulleys of said pulley block body, said power storage means being means for storing electricity, said motorization to rotate grappling element being an electric motor means and the same means to store electricity also feeding the mechanisms for receiving command signals and signals for the control of electric current generator and the electric motorization feed, further comprising a relative position sensor which monitors the angular positioning of the turning grappling element, with respect to pulley block body, and a gyrometer which monitors the absolute position of the turning grappling element.

11. Motorized load rotation device according to claim 10, wherein said turning grappling element (15) comprises an upper cylindrical part (42) mounted on a thrust ball bearing (43) inside pulley block body (11) and endowed with an orifice (44) for the passage of an electric turning collector (39) outlet cable in order to carry stored electricity to the electrical functions of gripping device (9) and, a lower part (45) outside of pulley block body (11) serving as a support for gripping device (9).

* * * * *